United States Patent [19]

Clements

[11] 4,167,876
[45] Sep. 18, 1979

[54] METHODS AND APPARATUS FOR DETERMINATION OF TERRESTRIAL SETTLEMENT PROFILES

[75] Inventor: David J. Clements, Westcliff-on-Sea, England

[73] Assignee: Soil Instruments Limited, London, England

[21] Appl. No.: 868,285

[22] Filed: Jan. 5, 1978

[51] Int. Cl.² .............................................. G01C 5/04
[52] U.S. Cl. ................................. 73/432 HA; 33/1 H
[58] Field of Search ........... 73/432 HA, 747; 33/1 H, 33/125 B, 367

[56] References Cited

U.S. PATENT DOCUMENTS 3,538,608  11/1970  Bronson .................... 33/125 B X
4,003,263  1/1977  O'Rourke ...................... 73/432 HA

FOREIGN PATENT DOCUMENTS 1251220  10/1971  United Kingdom ...................... 33/1 H Primary Examiner—S. Clement Swisher
Assistant Examiner—Joseph W. Roskos
Attorney, Agent, or Firm—Emory L. Groff, Jr.

[57] ABSTRACT

Method for the determination of settlement in foundation structures for buildings such as dams using a long length of tubing installed within the foundation structure in which mercury and water with a defined interface is forced along the tube from one end against a constant back pressure applied at the other end, the quantity of mercury displaced along the tube being measured together with the pressure applied to compute the position of the interface in the tube and the height thereof above a datum point. A construction of unit to provide the constant back pressure is also disclosed in the specification.

9 Claims, 7 Drawing Figures

METHODS AND APPARATUS FOR DETERMINATION OF TERRESTRIAL SETTLEMENT PROFILES

BACKGROUND OF THE INVENTION

This invention relates to a method and apparatus for determination of settlement in terrestrial environments such as the foundations of buildings or other structures by a system in which the elevation, referenced to a datum, of any point along the length of a small bore tube and incorporated into a foundation structure is determined. The tube is typically several thousands of feet in length and of nylon and incorporated during construction of a building, structure or embankment. The purpose being principally to evaluate the nature and degree of progressive settlement due to natural consolidation or externally influenced consolidation due to loads such as in dams, or foundation undermining. In such a system an interface between two immiscible liquids of considerably different densities (mercury and water) is advanced along the tube and from that it is possible to determine, by suitable measurement, the elevation of the interface. The background in the art of the invention is further explained in conjunction with FIG. 1 of the accompanying drawings wherein the one end of tube T has a reservoir R for mercury maintained at a constant elevation A and the other end of the tube has a pressure measuring gauge G. The tube has water W towards the other end and mercury M towards the one end with an interface I. The two liquids give considerable different hydraulic pressures per unit column height (5.91 p.s.i./foot for mercury and 0.43 p.s.i./foot for water and the pressure at the interface I is due to the mercury column is +5.91 p.s.i./foot and that due to water+ 0.45 p.s.i./foot, if the height of the head is h then the pressure shown by gauge G will be 5.91 h−0.43 h=5.84 h p.s.i. If the interface level is changed with respect to elevation A, gauge pressure will change by 5.48 p.s.i./foot of interface elevation change, increasing as h increases.

An object of this invention is to provide an improved method and means to give more accurate results.

Another object is to provide a novel construction of back pressure unit.

SUMMARY OF THE INVENTION

According to this invention there is provided a method for the determination of the elevation of a point of a length of tubing containing a liquid of higher density towards the one end and a liquid of lower density towards the other end, the liquids (typically mercury and water) being immiscible and having a defined interface within the tube, the method having the characteristic which comprises moving one liquid through tube by a pump means against a constant back pressure applied to the other liquid, measuring the quantity of either liquid during the movement to determine the position of the interface, and measuring the pressure applied to the one liquid.

In a mercury-water system if the constant back pressure applied to the water is K and is greater than any possible pressure of the mercury, then the pressure at a gauge at elevation A is K−5.48L (p.s.i.) where I is the elevation of the interface. If the interface level I is changed due to movement of one liquid the measured gauge pressure at A changes by 5.48 p.s.i./foot becoming zero when 5.48 h=K.

Preferably the mercury is moved at a steady rate through the tube continuously but a step-wise advancement can be used if required.

The invention further broadly provides a method for the determination of the elevation profile of a length of tubing installed within a foundation structure which method comprises the steps:

(a) delivering mercury into one end of the tubing, which otherwise contains water,
(b) measuring the rate of delivery of the mercury,
(c) applying a constant back-pressure to the emergence of water from the other end of the tubing,
(d) determining the pressure of the mercury at the one end of the tubing.

The method of the invention is preferably carried out by a means for determination of settlement for use in conjunction with a length of tubing installed within a foundation structure or the like, the means comprising a pump for delivering mercury into an end of the tube, a measuring device associated with the pump to indicate the quantity of mercury delivered, a pressure indicating means associated with the pump to indicate the pressure of mercury during delivery, and a means for connection with the other end of the tube and producing a constant back-pressure substantially independent of liquid flow through the tube.

Another feature of the invention is a means for producing a constant back pressure under dynamic conditions of flow including one or more columns containing a dense liquid with an inlet at the normally lower end connected to a rising smaller bore tube forming a U-tube assembly, the inlet having a number of small orifices communicating with the interior of the column, the arrangement being such that a less dense liquid, immiscible with the dense liquid on passing down the small bore tube under pressure depresses the denses liquid and on reaching the inlet disperses through the dense liquid in the column.

BRIEF DESCRIPTION OF THE DRAWINGS

The invention in the various aspects is further described by way of example and in conjunction with the accompanying drawings. In the drawings.

DESCRIPTION OF PREFERRED EMBODIMENTS

Figure 1:
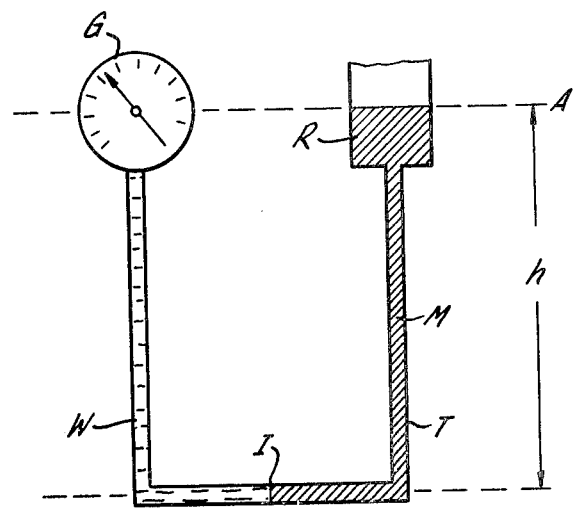
FIG. 1 is a schematic illustration of the background in the art of the invention.
Figure 2:
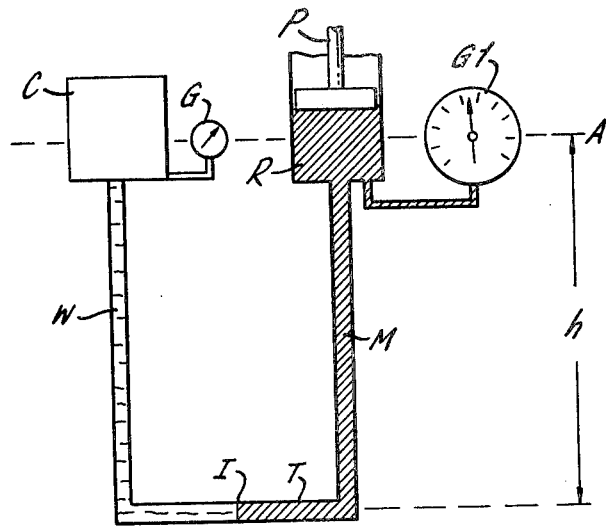
FIG. 2 illustrates schematically the method according to the invention.

Referring to FIG. 2 one end of a tube T is coupled to a pump P whereby a predetermined quantity or rate of flow of mercury M may be introduced from a supply reservoir R. A gauge G1 determines the mercury pressure at elevation A at any instant. The other end of the tube T contains water W and terminates in a means C which provides a constant back pressure K on the column of water. This pressure is shown on gauge G.

In this system, according to the invention, if the back pressure K is greater than 5.48 h (p.s.i.) where h is again the elevation between the gauge 1 and the mercury to water interface I, then the pressure at the gauge is K−5.48 h (p.s.i.). Thus if the interface level I is changed with respect to elevation A, gauge pressure will change by 5.48 p.s.i./foot, decreasing with increasing h and reaching zero when 5.48 h=K.

If the pump is operated to advance the interface at a very slow and constant rate, to minimise dynamic losses, then at any instant the pressure at the gauge is K−5.48 h+(dynamic head loss).

Figure 3:
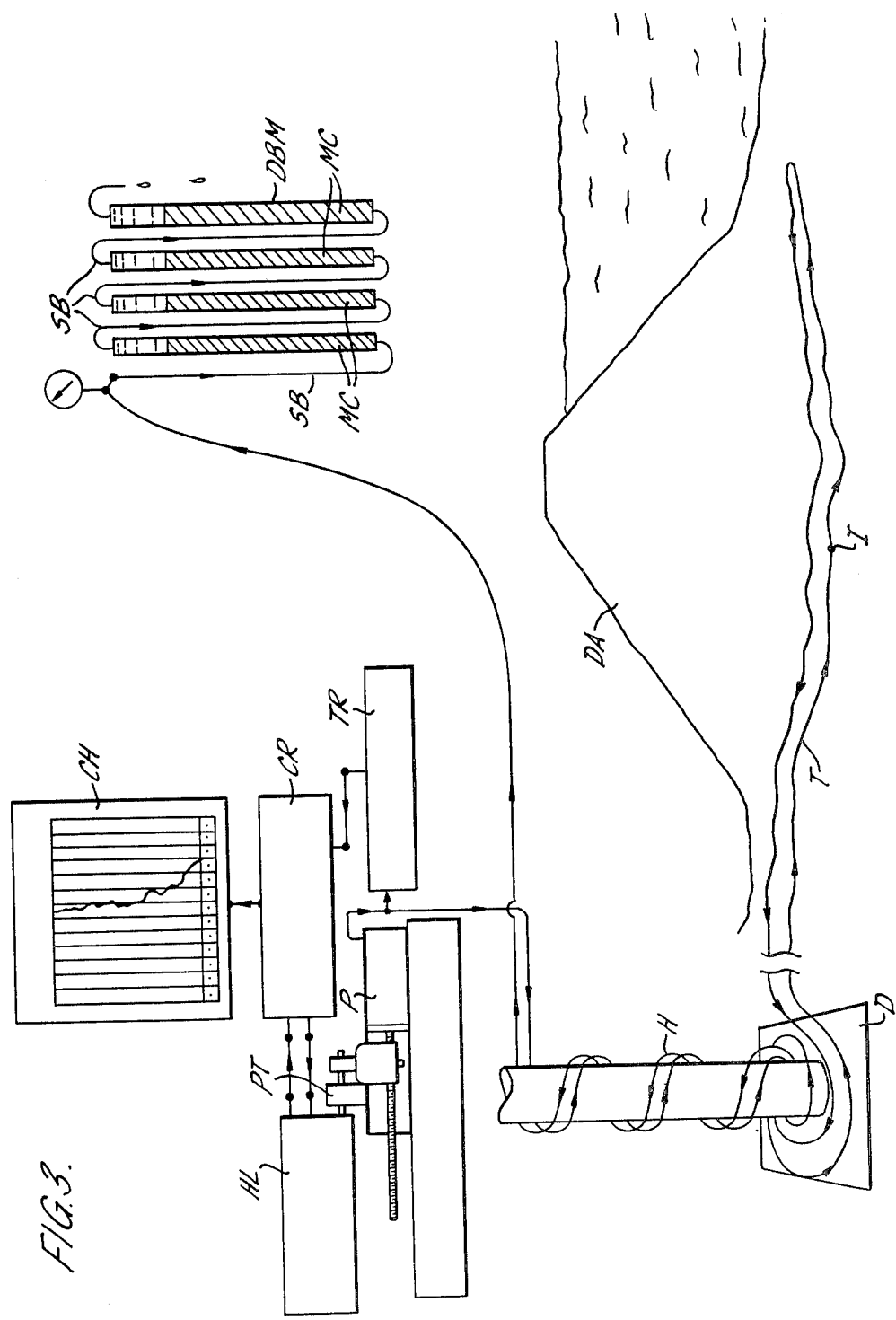
FIG. 3 illustrates an installation with an apparatus for determination of settlement in a dam.

A more practical installation is illustrated schematically in FIG. 3 wherein the run of tubing T is incorporated within the foundation structure of a dam DA and both ends are brought to a measuring station and laid on a level datum plate D which is surmounted by a vertically rising helix of tubing H forming a calibration riser pipe.

The tubing is 0.25 inch outside diameter, 0.11 inch inside diameter, nylon 66. The mercury input end of tube T is connected with constant delivery pump P with associated drive means serving to move mercury into the tube and hence to drive the mercury water interface I along the length of the tubing at a constant rate of, for example 0.15 c.c./second. A pressure transducer TR monitors the internal hydraulic pressure within the pump cylinder constantly and produces an electrical signal for feeding to a recording means via a signal correcting unit CR.

The drive to pump P also drives a potentiometer PT to produce a ramp voltage for feeding to the unit CR. Correction is applied at HL to compensate for the linear increase of dynamic head loss which occurs progressively as the mercury advances along the tube.

The unit CR amplifies the transducer signal and also superimposes a signal thereon derived from unit HL to correct for dynamic head loss, this combined signal is used to drive the chart recorder CH. The chart is advanced synchrounsly with the interface advance being proportional to the drive pump advance rate. The chart thus provides a trace of the elevation at all points along the tube T.

The other end of the tube terminates in a dynamic back pressure maintaining devices DBM which has the characteristic of maintaining a precisely defined back pressure, under dynamic conditions, as the mercury column and interface advances.

This device produces a constant magnitude hydraulic pressure which is used as a datum (K in FIG. 2) for all measuring functions. The operating principle of this unit is that water moving in small-bore tubing SB will push mercury before it, but when it meets a large-bore mercury column MC it forms into droplets and rises through the mercury without breaking the column. Thus the back pressure produced is defined by the height of the mercury column and the water droplet forming point. If a number of mercury columns are arranged in series the total back pressure is equal to the sum of the pressures produced by each individual column. Back pressure under dynamic conditions, may be very accurately defined and maintained by using this device.

The operating sequence and procedure, in outline, for such a settlement-profile plotting device is as follows:

1. The device is connected to the installed tubing loop and the tubing filled with water by means of a separate circulating pump (not shown).
2. The circulating pump is removed and the system pressurised by means of a hand-operated priming pump at the back pressure maintainer unit water discharges from the last mercury column thus establishing the back pressure level which will be maintained throughout the test cycle.
3. A mercury/water interface is established at the drive pump unit.
4. The interface-drive pump unit is caused to force mercury into the installed tubing thus instigating the test cycle. The device may now be left unattended.
5. The above action continues until the test is completed, where-upon electrical contacts installed prior to the back pressure maintainer input, sense the arrival of the mercury and switch off all active electrically operated units. The test date may later be removed at will and mercury recovered from the installed tubing for re-use.

Figure 4:
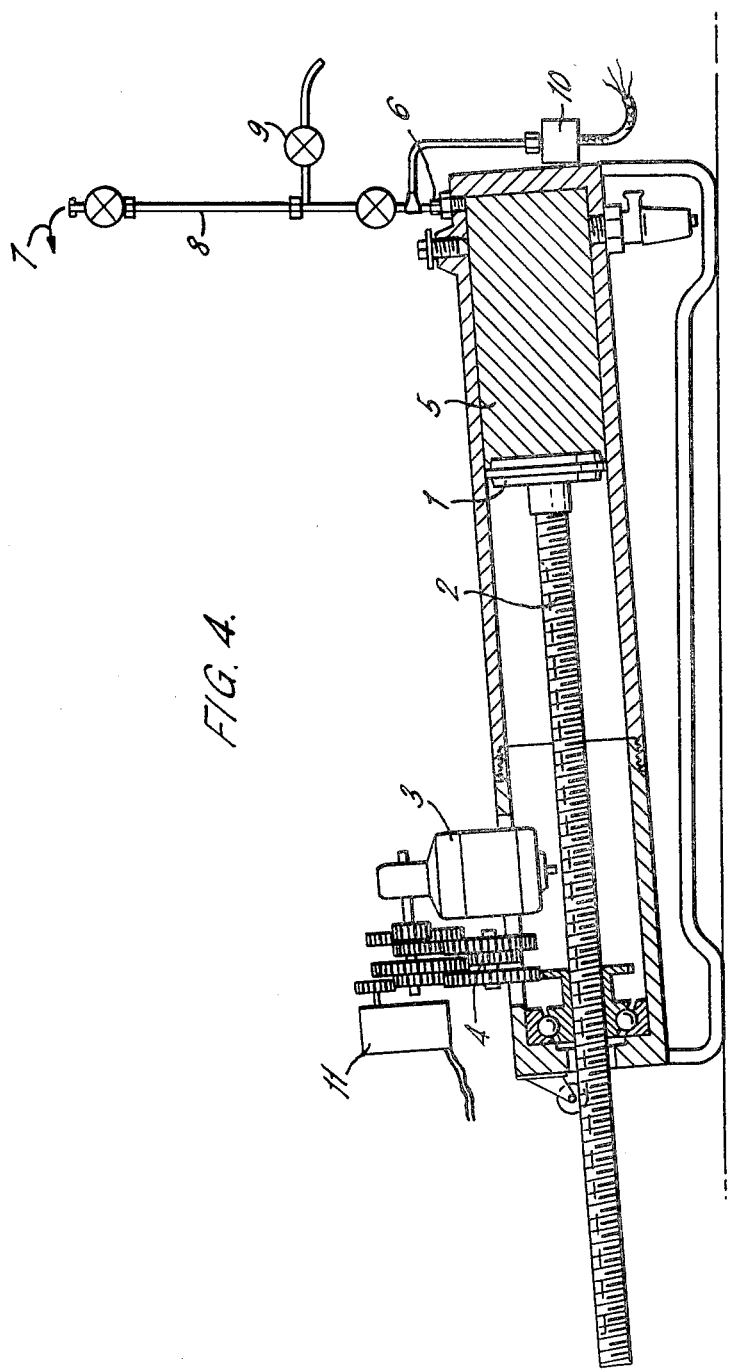
FIG. 4 shows one form of mercury drive pump.

FIG. 4 shows one construction of pump in which a piston 1 carried by a threaded shaft 2 is moved by a motor 3 via a gear train 4. Mercury is held within the cylinder 5 and is discharged through the outlet 6 into the tubing 7 via a perspex section of tube 8, This section allows the mercury to water interface to be set up visually. A bleed valve 9 is included together with pressure transducer 10. The gear train 4 also drives the dynamic head connection potentiometer 11. A final drive speed of 0.68 r.p.m. is used and shaft 2 has 11 turns per inch. The cylinder is 3.5 inches inside diameter with a usable stroke of 30 inches.

Other forms of pump are usable such as double acting cylinder and piston units fed from a reservoir and peristaltic pumps.

Figure 5:
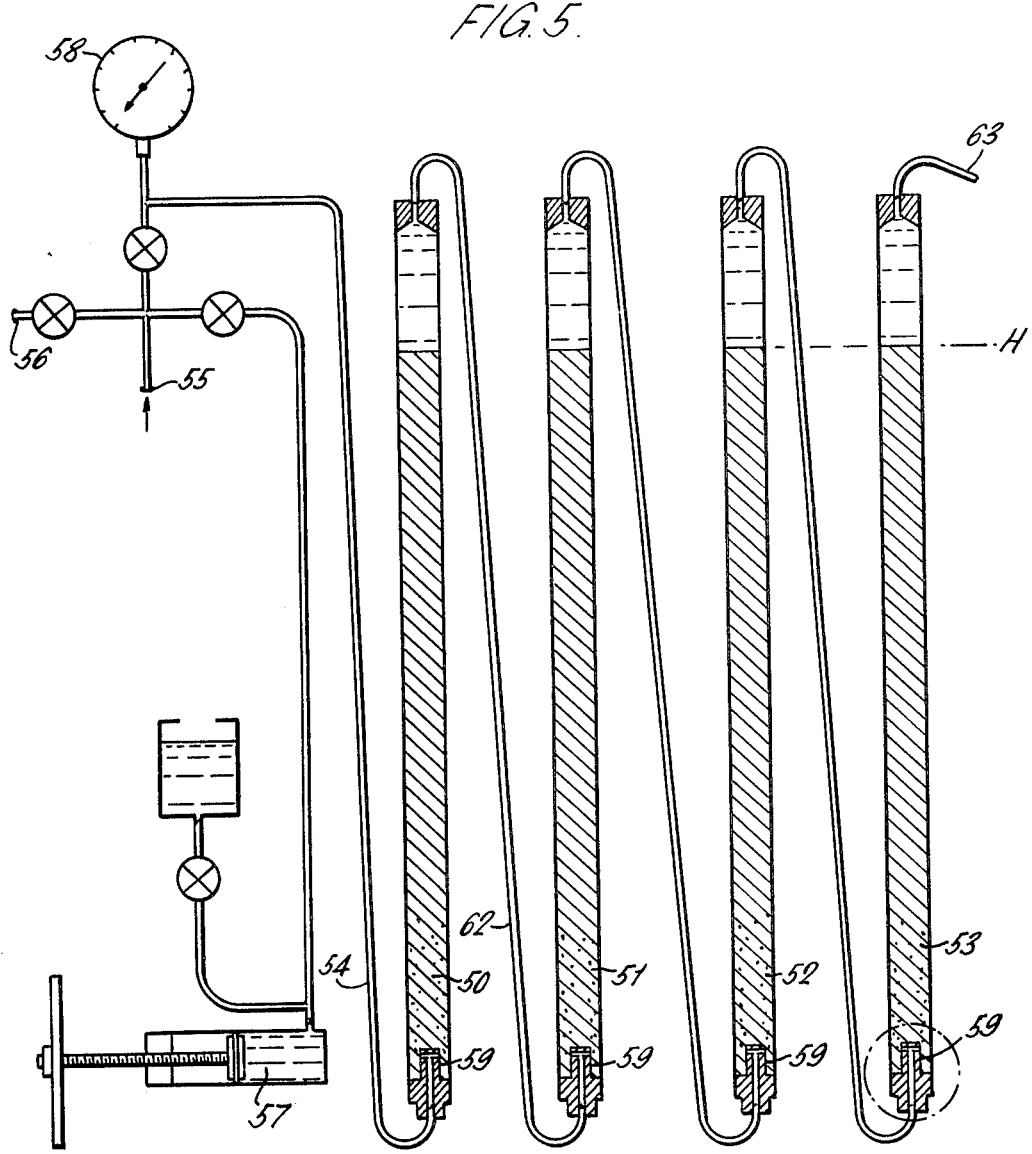
FIG. 5 shows a means for generating a constant back pressure.
Figure 6:
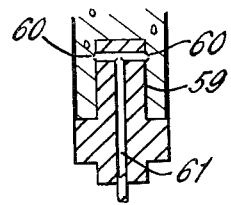
FIG. 6 is a detail of the base of a tube of the means of FIG. 5.

The precision dynamic back pressure maintainer is shown in FIGS. 5 and 6. This has four mercury columns 50 to 53 with the first column 50 connected at its base through a small bore tube 54 to the end of the tubing 55. Valved couplings to atmosphere 56 and to a pressure priming pump 57 are also provided, together with a pressure indicating gauge 58. When un-pressurised a mercury level H is established within the columns. When pressure is applied by pump 57 mercury within tube 54 is depressed and passes into column 50 through a venting insert 59 in the base. The mercury is depressed due to the small bore of tube 54.

The venting insert 59 is shown in detail in FIG. 6 and comprises four small diameter radial orifices 60 communicating with the tube inlet 61. The function of this insert is to ensure that when water reaches the orifices 60 it is dispersed as small droplets within the mercury and rises to the top of the tube 50.

Continually increasing pressure depresses mercury in tube 62 until water issues from insert 59 in column 51 and so on for the remaining columns 52 and 53. Water finally vents to atmosphere at 63. The pressurised apparatus can now be connected to the tube 55 and water issuing therefrom is subject to a constant and accurately maintained back pressure.

Figure 7:
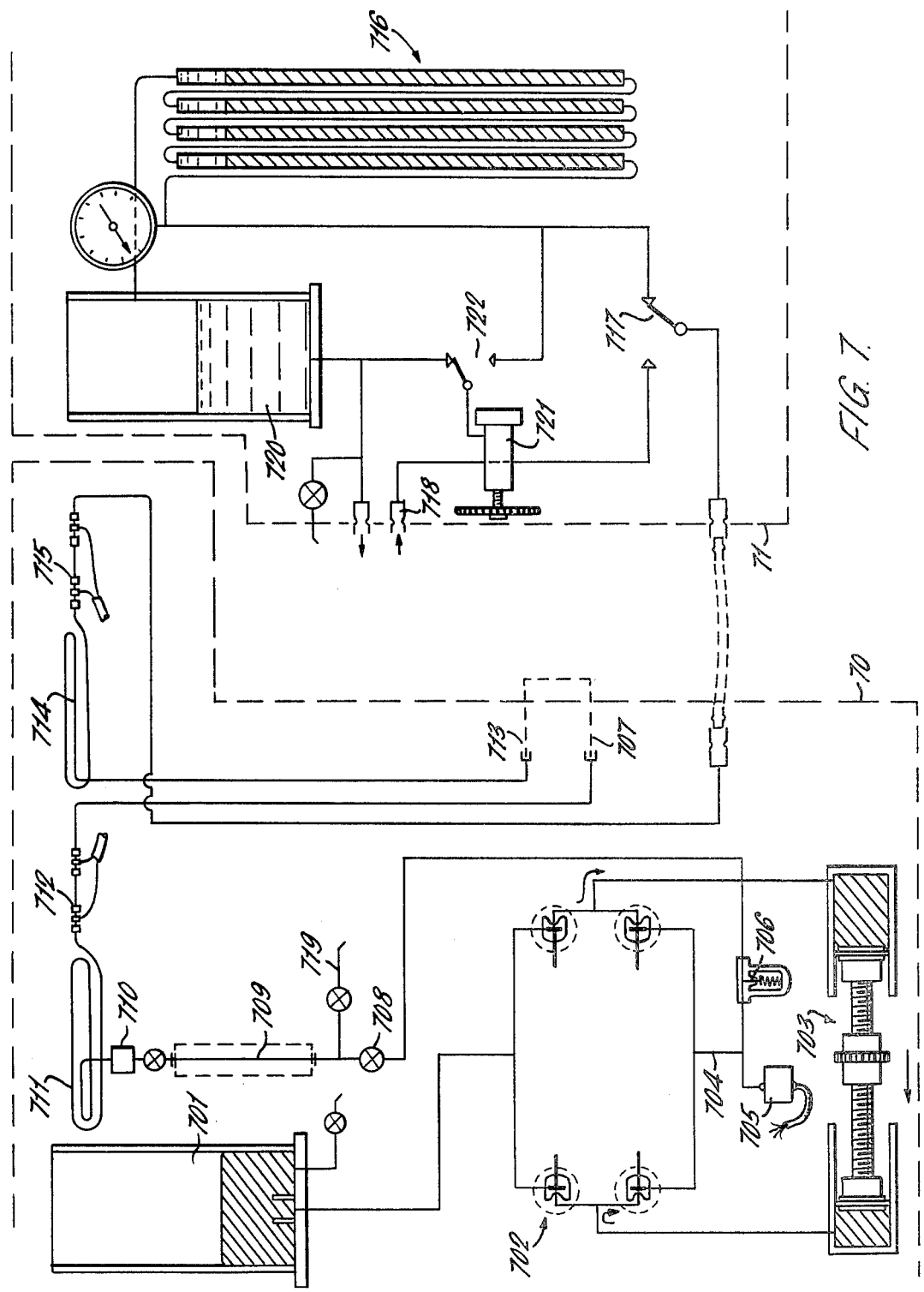
FIG. 7 shows the hydraulic circuit of a further apparatus.

A schematic diagram of a further arrangement of drive pump unit 70 and a back pressure unit 71 is shown in FIG. 7. The pump unit has a mercury reservoir 701 coupled with an assembly of valves 702 operatively coupled with a twin piston and cylinder double acting pump unit 703. The discharge line 704 of the pump system includes pressure transducer 705 and pressure relief valve 706. The line feeds the installed length of tubing 707 through a valve 708, a clear section 709 for observation of the water to mercury interface, a water trap 710, a helix of tubing 711 establishing a reference datum level, and an electrical contact assembly 712 to sense the advance of the mercury.

The return line 713 feeds a second datum level helix 714 followed by a further electrical contact assembly 715 to sense the returning mercury and passes to the back pressure unit 71. The returning water is fed to the back pressure maintaining columns 716 substantially as described in FIGS. 5 and 6.

Valve means 717 are provided to afford flushing of the lines through inlet 718 and outlet 719, (in unit 70) flushing water being taken from reservoir 720 to which the final column overflow of the back pressure maintainer is also connected.

Priming pump 721 is connected via change-over valve 722 to either the reservoir 720 or the column 716.

The back pressure K has to be greater than the mercury pressure at any instant and the actual pressure selected will depend on the installation.

It is possible to arrange for the interface to be advanced step-wise a predetermined or measured amount to obtain discrete readings at spaced locations rather than continuously if desired. Suitable control circuiting may be provided to effect such a discrete measurement system automatically. This system may be modified so that lengths of tubing of no interest are bypassed in so far as measurements are concerned. The usual precautions to ensure that a distinct interface is obtained and that substantially no inclusion of air are present in the water is necessary but these will be apparent to those concerned with this field.

I claim:

1. The method for the determination of the elevation of a point of a length of tubing containing a liquid of higher density towards the one end and a liquid of lower density towards the other end, the liquids (typically mercury and water) being immiscible and having a defined interface within the tube, the method being characterised by moving one liquid through the tube by a pump means against a back pressure applied to the other liquid, the back pressure applied being of constant value independent of the elevation of the interface, measuring the quantity of either liquid displaced during the movement to determine the position of the interface within the tube length, and measuring the pressure applied to the one liquid.

2. The method of claim 1, wherein the mercury is caused to move through the tube at a constant rate by a pump means, the pressure at the pump means being measured continuously during movement to produce a profile of the elevation of the interface during progression along the tube, the constant back pressure applied being always greater than the pressure due to mercury.

3. The method of claim 1, wherein the mercury is caused to move step-wise through the tube by a pump means and by a measured amount, the pressure at the pump being measured and the mercury advanced a further step, the constant back pressure being always greater than the pressure due to mercury, whereby the elevation of the point of the interface attained at each step is determined.

4. The method for the determination of the elevation profile of a length of tubing installed within a foundation structure which method is characterised by the steps:
    (a) delivering mercury into one end of the tubing, which otherwise contains water,
    (b) measuring the rate of delivery of the mercury,
    (c) applying a constant back-pressure to the emergence of water from the other end of the tubing, which back pressure is constant regardless of the elevation of the interface within the tube,
    (d) determining the pressure of the mercury at the one end of the tubing.

5. Means for determination of settlement for use in conjunction with a length of tubing installed within a foundation structure or the like, the means comprising a pump for delivering mercury into an end of the tube a measuring device associated with the pump to indicate the quantity of mercury delivered, a pressure indicating means associated with the pump to indicate the pressure of mercury during delivery, and a means for connection with the other end of the tube and producing a constant back pressure substantially independant of liquid flow through, and interface elevation in the tube.

6. Means as claimed in claim 5, wherein the pump delivers mercury at a constant rate and the measuring device thereof is synchronised with a recording chart drive, the chart recording a trace derived from the electrical output of a pressure transducer associated with the pump.

7. Means as claimed in claim 5, wherein the measuring device, provides an indication of advancement of the delivery of mercury and provides an electrical signal fed to means for correcting the recorded chart trace according to dynamic pressure head loss in the tubing.

8. Means for producing a constant back pressure under dynamic conditions of flow including one or more columns containing a dense liquid with an inlet at the normally lower end connected to a rising smaller bore tube forming a U-tube assembly, the inlet having a number of small orifices communicating with the interior of the column, the arrangement being such that a less dense liquid, immiscible with the dense liquid on passing down the small bore tube under pressure depresses the denses liquid and on reaching the inlet disperses through the dense liquid in the column.

9. Means as claimed in claim 8, wherein an outlet at the top of a column is connected with the small bore tube of a second U-tube assembly.

* * * * *